June 9, 1964 J. W. RUSH 3,136,586
FLUID PRESSURE BRAKE APPARATUS WITH PERIODIC
ACKNOWLEDGEMENT TYPE SAFETY CONTROL
Filed June 22, 1962

INVENTOR.
JOHN W. RUSH
BY *A. A. Steinmiller*
ATTORNEY

United States Patent Office 3,136,586
Patented June 9, 1964

3,136,586
FLUID PRESSURE BRAKE APPARATUS WITH PERIODIC ACKNOWLEDGMENT TYPE SAFETY CONTROL
John W. Rush, Pittsburgh, Pa., assignor to Westinghouse Air Brake Company, Wilmerding, Pa., a corporation of Pennsylvania
Filed June 22, 1962, Ser. No. 204,514
9 Claims. (Cl. 303—19)

This invention relates to fluid pressure operable brake apparatus with periodic acknowledgment safety control means which requires certain periodic acknowledging operations by the operator of the vehicle to forestall a penalty control operation, such as a brake application, which will otherwise be effected automatically by the safety control means should the operator fail to perform said acknowledgment operations.

A safety control device or apparatus may be associated with the braking system of a vehicle for the purpose of insuring that the vehicle brakes would be applied automatically in the event that the operator of a vehicle, such as a railway train, for example, becomes incapacitated for performing his duties. Some of the presently known devices such as a "dead man" valve, which required that the operator keep his foot on a foot pedal associated therewith to prevent a brake application from being effected automatically, are inadequate in that the purpose thereof can be easily defeated by placing a weight on the foot pedal. Other safety control apparatus have been devised which require periodic acknowledging operations by the operator, the interval of frequency of such periodic acknowledging operations being determined in some instances by a fixed period of time, in others a fixed distance traveled by the vehicle, while in others the time interval is related to the rate of speed of the vehicle so that the higher the rate of speed, the shorter the time interval and hence the greater the frequency of acknowledgment operation. Some of the latter-mentioned apparatus are complex in structure and function and are, therefore, susceptible to malfunctioning and failure as well as being costly to produce.

Accordingly, the object of this invention is to provide an improved safety control apparatus of the periodic acknowledging type for use with fluid pressure brake apparatus and for use primarily with railway locomotive brake equipment, though not necessarily limited to such use, said improved safety control apparatus being characterized by simplicity in structure and, therefore, more reliability in operation. The invention, very briefly, comprises a safety control circuit interposed in the safety control pipe between the engineer's automatic brake valve and a warning device, such as a whistle, via which whistle fluid pressure may be restrictedly released from said control pipe. Reduction of fluid pressure in the control pipe, unless checked before reaching a certain low pressure value, will effect a penalty brake application. In order to prevent a penalty brake application, the operator is required to operate a foot pedal associated with a foot valve device, at predetermined intervals, to alternately supply and release fluid pressure to and from opposite sides of a reciprocable piston of a relay valve device whereby a valve associated therewith alternately opens and closes the control pipe to atmosphere. In the event the operator fails to operate the foot pedal within a permissible time limit, that is, before fluid pressure in the control pipe reduces to the critical low value, the control pipe will continue to blow down until the reduction of fluid pressure therein reaches said critical low value sufficient to effect a penalty brake application. The time interval between each cycle of operation is determined by timing volumes and choke-check valves arranged between the source of pressurized fluid and the relay valve device. A cut-off valve device is interposed in the control pipe ahead of the safety control circuit and is responsive to a predetermined degree of brake cylinder pressure for cutting off the safety control circuit during such time that a brake application of a predetermined magnitude or greater is in effect.

The single figure drawing shows a schematic arrangement, partly in section, of a safety control circuit with a brake system of a railway locomotive and embodying the invention.

*Description and Operation—FIG. 1*

For purposes of illustrating an application of the safety control apparatus embodying the invention, said apparatus is shown in the drawing as being operatively connected to brake control equipment of the fluid pressure operable type of a railway locomotive. The locomotive brake control equipment may be of any suitable type such as that fully described and illustrated in Instruction Pamphlet No. 5066, dated March 1957, and published by Westinghouse Air Brake Company, said brake control equipment being designated "24-RL Locomotive Brake Equipment." Since a detailed description of the brake control equipment is not deemed essential to an understanding of the invention, and since reference may be had to the above-mentioned publication, the brake control equipment, as shown in the drawing, will be only very briefly described. Such equipment comprises an engineer's automatic brake valve device 1 designated in the above-mentioned pamphlet as the "DS-24 Brake Valve" and manually operable by the engineer for controlling fluid pressure in a brake pipe 2 connected via a branch pipe or conduit 3 to said engineer's brake valve device. As is well known by those skilled in the art, operation of the engineer's brake valve device 1 for effecting a reduction of fluid pressure in the brake pipe 2 causes a brake control valve device 4, designated in the above-mentioned pamphlet as the "D-24 Control Valve," to effect supply of fluid under pressure from a source such as an auxiliary reservoir 4a to a brake cylinder device 5, whereby a brake application corresponding to the degree of reduction in brake pipe pressure is applied to the locomotive wheels (not shown). Operation of the automatic brake valve device 1 for effecting restoration of fluid pressure in the brake pipe 2 to a preselected normal value causes the brake control valve device 4 to effect venting of brake-applying pressure from the brake cylinder device 5 and thereby release the brake application.

One of the components of the automatic brake valve device 1 is a service application portion 6 comprising valve means (not shown) operated by a piston subjected on one side to fluid pressure in a pressure chamber adjacent thereto, said chamber being supplied with fluid under pressure via a conduit 7 from a source, such as a main reservoir 8 which may be charged with fluid at a pressure of 140 p.s.i., for example, while the opposite side of said piston is subjected to the force of a biasing spring and fluid pressure in a control chamber adjacent thereto, said control chamber having one end of a safety control passage 9 opening thereinto, while the other end of said control pasage connects to one end of a safety control pipe or to conduit 10. Both the pasage 9 and the conduit 10 are charged, at a restricted rate, from the main reservoir 8 via the pressure chamber and the control chamber of the service application portion, which are connected by a choked passage 11 extending through the piston from one side thereof to the other. When fluid pressure in the control passage 9, and therefore in the control chamber, is reduced below a preselected value such as 90 p.s.i., for example, the piston-operated valve means is actuated by the opposing pressure in the pressure chamber to a brake application position, whereby the automatic brake valve device 1 is actuated to cause a reduction of fluid pressure in brake pipe 2 for effecting a brake application, as above described. When fluid pressure in the control passage 9 is restored to a value above 90 p.s.i., the piston-operated valve means is returned to a normal position in which the brake valve device 1 effects restoration of normal fluid pressure in the brake pipe 2, and the control valve device 4 effects a release of the brake application.

It should be understood that each of the cars making up a train is provided with a brake control valve device similar to the brake control valve device 4 and that the brake pipe 2 extends the entire length of the train so that the brakes on the entire train are controlled from the engineer's automatic brake valve device 1.

In locomotive brake equipment of the type above described, the safety control pasage 9 is normally connected via conduit 10 to a safety control device or devices such as the "dead man" or safety valve device, above described, and an audible or visible warning device for indicating that the safety control devices have been actuated in response to an emergency situation.

A cut-out cock 12, manually operable from the exterior of the automatic brake valve device 1, is interposed in safety control passage 9 betwen the control chamber of the service application portion 6 of said valve device and the conduit 10, whereby, in the event of undesirable pressure reduction in said safety control passage due to malfunctioning of the safety control devices or excessive leakage of fluid pressure in the safety control system, the cutout cock may be operated to close off communication between said service application portion and the safety control devices to prevent untimely application of the brakes due to said malfunctioning of said safety control devices or excessive leakage therein.

According to the invention, a relay valve device 13 is connected to conduit 10 in which a cut-off valve device 14 is interposed for rendering the safety control apparatus ineffective during such time that a brake application of a certain degree or greater is in effect. The cut-off valve device 14 is simply a two-position valve device including, though not shown, piston-operated valve means spring-biased toward an open position in which a supply communication 15, indicated symbolically in the drawing by a solid line, is established to permit flow of pressurized fluid through conduit 10. The cut-off valve device 14 is provided with a pressure chamber (not shown) which is connected via a conduit 16 to a brake cylinder conduit 17 via which actuating fluid pressure is supplied to the brake cylinder 5 under the control of the control valve device 4, as above described. The piston-operated valve means in the cut-off valve device 14 is operable reseponsively to fluid in the control chamber above a predetermined pressure (such as a minimum of 25 p.s.i., for example, adequate for causing the brake cylinder 5 to effect a service brake application and adequate for overcoming the opposing force of the biasing spring acting on said piston-operated valve means), to a closed position in which communication 15 is closed and an atmospheric communication 18, indicated symbolically in the drawing by a broken line, is established for a purpose to be hereinafter disclosed.

The other end of conduit 10 opposite to the end connecting with passage 9 of the engineer's brake valve device 1, connects with a passageway 19 provided in the relay valve device 13 and leading to an intermediate chamber 20 formed in said relay valve device. An exhaust valve 21 is operably disposed in the intermediate chamber 20 for controlling communication between passageway 19 and a passageway 22 provided in the relay valve device 13, said passageway 22 being connected at one end to a conduit 23 having affixed thereon a fluid pressure operable warning device, such as a whistle 24. In addition to the whistle 24, via which pressurized fluid may escape from conduit 23, a restricted vent or choke 25 of predetermined flow rate may be connected to conduit 23 to provide the desired rate of escape of pressurized fluid therefrom.

The exhaust valve 21 has an unseated position relative to an annular valve seat 26 formed adjacent intermediate chamber 20 at one end of a bore 27 extending coaxially through a valve seat member 28, in which unseated position of said exhaust valve passageway 19 is in communication with pasageway 22 via said bore. The exhaust valve 21 has a fluted guide stem slidably disposed in bore 27 to permit flow of pressurized fluid therepast when said valve is in its unseated position. The exhaust valve 21 is operable to a seated position on valve seat 26 in which seated position of said exhaust valve communication between passageways 19 and 23 is cut off.

The valve seat member 28 is slidably disposed, in sealing relation, in a coaxially disposed bore 29 formed in the casing of the relay valve device 13 and is cushioned by a spring 30 against downward movement, as viewed in the drawing, when the exhaust valve 21 is operated to its seated position on the valve seat 26, thereby providing a soft cushioning action when said valve is seated and thus prolonging the service life of the valve device.

Operation of the exhaust valve 21 is accomplished by a diaphragm-type piston 31 operably disposed in the upper portion of the valve device 13, as viewed in the drawing. Piston 31 is subjectable to fluid pressure on opposite sides or pressure faces thereof adjacent respective pressure chambers 32 and 33, said chambers being connected to respective passageways 34 and 35 formed in the relay valve device 13. The side of piston 31 adjacent chamber 33 is in contact with a piston follower 36 having a centrally located stem 37 extending coaxially therefrom and operatively connected with the exhaust valve 21 for effecting operation thereof according to movement of said piston. A spring 38 disposed in chamber 33 coacts with any fluid pressure in said chamber to urge piston 31 upwardly, as viewed in the drawing, toward a first or upper position in which exhaust valve 21 is lifted off valve sat 26 to its unseated position, said piston being operable downwardly in response to fluid pressure in chamber 32 exceeding the combined effects of spring 38 and fluid pressure in chamber 33, to a second or lower position in which said exhaust valve is moved to its seated position on said valve seat.

Passageway 34 is connected via a conduit 39 to a timing volume or reservoir 40, while passageway 35 is connected via a conduit 41 to a timing volume or reservoir 42, each of said reservoirs, in turn, being connected by respective conduits 43 and 44 to a fluid pressure delivery conduit 45 leading from a foot-pedal operated valve device 46. Flow rate control means comprising choke 47 and a one-way check valve 48 are interposed in conduit 43 in parallel relation, the direction of flow through said check valve being, as indicated by the arrow, from conduit 45 toward reservoir 40. Similarly, flow rate control means comprising a choke 49 and a one-way check valve 50 are interposed in conduit 44 in parallel relation, the direction of flow through said check valve being, as indicated by the arrow, from reservoir 42 toward conduit 45.

The foot valve device 46 is connected on the supply side, via a conduit 51 and conduit 7, to the source of pressurized fluid in main reservoir 8 and is operated by a foot pedal 52 provided thereon. When the foot pedal 52 is in a supply or raised position, in which it is shown in the drawing, a supply communication 53, indicated in the drawing as a solid line, is established through the valve device 46 to permit pressurized fluid to be supplied from main reservoir 8, via conduit 51, to conduit 45 for a purpose to be hereinafter disclosed. When the foot pedal 52 is operated to a cut-off or depressed position, indicated by a broken line in the drawing, communication 53 is closed and an exhaust communication 54, indicated symbolically in the drawing by a broken line, is established whereby conduit 45 is vented to atmosphere via a vent port 55.

In considering the operation of the safety control apparatus embodying the invention, let it be assumed that the train is under way with the brakes released and control passage 9 and, therefore, conduit 10 are charged to a normal pressure of 140 p.s.i., from reservoir 8 via conduit 7 and choke 11. Let it also be assumed that, at the moment, the foot pedal 52 of the foot valve device 46 is in its raised position.

With foot pedal 52 in its raised position, pressurized fluid from main reservoir 8 is supplied via conduits 7 and 51, communication 53, conduit 45, conduits 43 and 45, through choke 47 and check valve 48 to timing reservoir 40, through choke 49 to timing reservoir 42, and from timing reservoirs 40 and 42 through conduits 39 and 41 to chambers 32 and 33, respectively, of the relay valve device 13. During such charging of chambers 32 and 33 of the relay valve device 13, due to the effect of check valve 50 interposed in conduit 44, the flow of fluid through said conduit, that is, from conduit 45 to reservoir 42, is restricted by way of choke 49. Thus the build-up of fluid pressure in chamber 33 occurs at a slower rate than build-up of pressure in chamber 32, since the direction of flow through check valve 48 interposed in conduit 43 permits unimpeded flow from conduit 43 to reservoir 42, thence to chamber 32.

Due to the rapid build-up of fluid pressure in chamber 32, such pressure acting on the adjacent side of piston 31, when built up sufficiently to overcome the combined opposing effects of spring 38 and fluid pressure in chamber 33, causes said piston to move downwardly, as viewed in the drawing, to its lower position, and thereby operate exhaust valve 21 to its seated position on valve seat 26. With exhaust valve 21 in its seated position, communication between passageways 19 and 22 is cut off, and venting of conduit 10 and blowing of whistle 24, which commenced with the initial charging of said conduit, is also terminated. If blow down of conduit 10 were not terminated before fluid pressure therein had reduced to the critical low value of 90 p.s.i., a penalty brake application would be effected automatically, as above described.

With the foot pedal 52 still in its raised position and with piston 31 of the relay valve device 13 in its lower position, fluid pressure in chamber 33 continues to build up until such pressure in said chamber, along with the biasing effect of spring 38, is effective for moving said piston to its upper position and thereby unseat exhaust valve 21. With exhaust valve 21 unseated, conduit 10 is vented to atmosphere, as above described, via conduit 23, choke 25 and the whistle 24, which emits a warning sound. Upon hearing the warning sound from whistle 24, the operator immediately depresses foot pedal 52 of the foot valve device 46 to cut off such venting of conduit 10, in a manner to be immediately described, before a penalty brake application is effected.

By depressing foot pedal 52, the operator causes supply communication 53 in the foot valve device 46 to be closed and exhaust communication 54 to be opened, whereby fluid pressure in both chambers 32 and 33 and in both reservoirs 40 and 42 commences to vent to atmosphere via the respective conduits 39—43, 41—44, conduit 45, said exhaust communication and vent port 55. During such venting of fluid pressure from chambers 32 and 33 and from timing reservoirs 40 and 42, it will be noted that the flow directions through the respective check valves 48 and 50 permit unrestricted venting from chamber 33 and reservoir 42, whereas venting from chamber 32 and reservoir 40 is restricted to the flow capacity of choke 47. Thus, while fluid pressure in chamber 33 is rapidly dissipated, fluid pressure in chamber 32, exhausting at a relatively slower rate, prevails once more to cause the piston 31 to be operated to its lower position and thereby reseat exhaust valve 21 to cut off further venting of conduit 10 before pressure therein has been reduced to 90 p.s.i., as above described, stop the whistle signal and prevent a penalty brake application. As soon as valve 21 is reseated, fluid pressure in conduit 10 increases to the normal pressure of 140 p.s.i.

The operator continues to hold the foot pedal 52 of the foot valve device 46 in its depressed position while fluid pressure in chamber 32 and reservoir 40 continues to exhaust at a rate determined by choke 47 and for a period of time determined primarily by the volume of said reservoir. When fluid pressure in chamber 32 has been reduced to a predetermined low degree, spring 38 becomes effective for moving piston 31 to its upper position and thereby unseat valve 21 once more. Control pipe 10 again commences to vent, as above described, via choke 25 and whistle 24 which again emits a warning signal. Upon hearing the warning signal, the operator lets up the foot pedal 52 to cut off exhaust communication 54 of the foot valve device 46 and reopen supply communication 53. Thus, the cycle is completed and with reopening of supply communication 53, a new cycle, as above described, is commenced.

The time interval required for each cycle, of course, depends upon the flow capacities of the various chokes in the system and the volumes of the timing reservoirs. The system, however, functions, as above described for one cycle, in continuous cycling fashion until either the train is brought to a stop or a brake application is effected should the operator fail to perform the perscribed functions of releasing and depressing the foot pedal 52 as required. The engineer's brake valve device 6 has a lockout mechanism (not shown) so that in the event the operator fails to perform the required operation within the permissible time, either inadvertently or due to incapacitation, and a brake application is automatically effected, the brakes remain in the applied state until said engineer's brake valve device is operated to another of its several positions for effecting various control operations of the vehicle brakes. Thus, there is no possibility that the train will move without being tended.

Having now described the invention, what I claim as new and desire to secure by Letters Patent, is:

1. A fluid pressure safety control system comprising control conduit means normally charged with fluid at a preselected pressure and in which a reduction in excess of a certain amount from said preselected pressure is effective to initiate a penalty control operation, fluid pressure differential responsive valve means including fluid pressure responsive means subjectable to opposing fluid pressures and operable from one position, in which a venting communication for effecting reduction of fluid pressure in said control conduit means is opened, to another position, in which said venting communication is closed and further reduction of fluid pressure in said control conduit means is terminated, and reversely, depending upon the direction of the resultant differential force between said opposing fluid pressures, and means including manually operable control means operative in one position for effecting simultaneous supply of pressurized fluid to opposite sides of said fluid pressure responsive means at different relative rates and operable to a different position for effecting simultaneous release of fluid pressure from said opposite sides of said fluid pressure responsive means at different relative rates for so controlling the direction of said resultant differential force as to effect alternate operation of said fluid pressure differential responsive valve means from its said one position to its said other position and reversely so as to prevent reduction of fluid pressure in said control conduit means in excess of said certain amount.

2. A fluid pressure safety control system as defined in claim 1, further characterized by a warning device associated with said venting communication for emitting a warning signal each time said fluid pressure differential responsive valve means is operated to its said one position for effecting reduction of fluid pressure in said control conduit means.

3. A fluid pressure safety control system as defined in claim 1, wherein said fluid pressure responsive means has two oppositely arranged pressure faces adjacent respective pressure chambers and subject to the respective pressures of fluid in said pressure chambers, and wherein said control means comprises two conduits, in parallel relation, connecting respectively with said pressure chambers, and via which fluid under pressure is supplied to and released from said oppositely arranged pressure chambers, and respective flow rate control means interposed in each of said two conduits for permitting simultaneous supply of fluid under pressure to one of said chambers at a predetermined low rate and to the other chamber at a rate higher than said low rate, and simultaneous release of fluid under pressure from said other chamber at a predetermined low rate and from said one chamber at a rate higher than said low rate.

4. A fluid pressure safety control system as defined in claim 3, wherein said control means further comprises a manually operated valve device having one position, in which pressurized fluid is supplied via said two conduits to said oppositely arranged pressure chambers, and being operable to another position for cutting off such supply of pressurized fluid and effecting release of fluid pressure from said pressure chambers.

5. A fluid pressure safety control system as defined in claim 3, wherein the respective pressure face adjacent said one pressure chamber is subject, in any orientation of said fluid pressure responsive valve means, to the biasing effect of a spring disposed in said one pressure chamber and to the pressure of fluid therein, the other of said pressure faces being subject to the pressure of fluid in said other pressure chamber.

6. A fluid pressure safety control system comprising control conduit means normally charged with fluid at a preselected pressure and in which a reduction in excess of a certain amount from said preselected pressure is effective to initiate a penalty control operation, first valve means operably interposed in said control conduit means and having one position in which said control conduit means is vented to atmosphere for effecting reduction of fluid pressure therein and being operable to a different position for cutting off such venting of said control conduit means to atmosphere, valve-operating means having oppositely arranged pressure faces and including biasing means acting constantly on one of said pressure faces for biasing said valve-operating means toward a first position in which said first valve means is operated to its said one position, said valve-operating means being operable to a second position in which said first valve means is operated to its said different position, supply conduit means via which pressurized fluid may be supplied to and vented from said oppositely arranged pressure faces, and second valve means including flow rate control means interposed in said supply conduit means and operative in a supply position for simultaneously effecting supply of pressurized fluid to said one pressure face at a predetermined low rate and to the other pressure face at a predetermined rate higher than said low rate for causing operation of said valve-operating means to its said second position and maintain it therein until fluid pressure acting on said one pressure face in conjunction with said biasing means has built up sufficiently to cause operation of said valve-operating means to its said first position, said second valve means being operable to a cut-off position for simultaneously effecting cut-off of pressurized fluid supply to said pressure faces and release of fluid pressure from said other pressure face at a certain low rate and from said one pressure face at a certain rate higher than said certain low rate for causing operation of said valve-operating means to its said second position and maintain it therein until fluid pressure acting on said other pressure face has dissipated sufficiently to render said biasing means effective for restoring said valve-operating means to its said first position, whereby cycling action of said valve-operating means between its said first and second positions may be effected by operation of said second valve means alternately between its said supply and cut-off positions.

7. A fluid pressure safety control system comprising control conduit means normally charged from one end with fluid at a preselected pressure and in which a certain degree of reduction of said preselected pressure is effective to initiate a penalty control operation, a warning device at the other end of said control conduit means via which fluid pressure may be vented therefrom at a preselected rate and by which an apprising signal is emitted, a piston-operated valve device interposed in said control conduit means and having formed therein a first pressure chamber disposed oppositely to a second pressure chamber, an exhaust valve operable in said piston-operated valve device and having an unseated position in which said conduit means is vented to atmosphere via said warning device for effecting reduction of fluid pressure in said control conduit means and being operable to a seated position for closing said control conduit means to atmosphere, a piston reciprocably operable in said piston-operated valve device for operating said exhaust valve and having a first pressure face oppositely disposed to a second pressure face, said pressure faces being subjectable to fluid pressure in said first and second pressure chambers, respectively, a biasing spring disposed in said first pressure chamber for constantly urging said piston toward an upper position in which said exhaust valve is operated to its unseated position, said piston being operable to a lower position in which said exhaust valve is operated to its seated position, first supply conduit means via which pressurized fluid may be supplied to and vented from said first pressure chamber, second supply conduit means via which pressurized fluid may be supplied to and vented from said second pressure chamber, a source of fluid under pressure, a supply conduit connecting said source of fluid under pressure to both said first and second supply conduit means, first choke and check means interposed in said first supply conduit means for restricting flow of pressurized fluid to said first chamber to a certain low rate and for permitting venting of such pressurized fluid therefrom at a rate higher than said low rate, second choke and check means interposed in said second supply conduit means for restricting venting of pressuribed fluid from said second chamber to a certain low pressure and for permitting flow of pressurized fluid thereto at a rate higher than said certain low rate, and a foot valve device interposed in said supply conduit and having a foot pedal associated therewith, said foot pedal being operative to a released position in which supply of pressurized fluid from said source is effected via said foot valve device simultaneously to both said first and second pressure chambers to cause operation of said piston, responsively to fluid pressure supplied to said second chamber at said higher rate, to its said lower position and to maintain it therein until fluid pressure has built up sufficiently in said first pressure chamber, as determined by said first choke and check means, to act in conjunction with said biasing spring for causing said piston to be operated responsively thereto to its said upper position, said foot pedal being operable to a depressed position in which said supply of pressurized fluid to said first and second chambers through said foot valve device is cut off and simultaneous venting of said first and second chambers through said foot valve device is effected for causing operation of said piston, responsively to momentary higher fluid pressure in said second chamber established upon venting of fluid pressure from said first chamber at said higher rate, to its said lower position and to maintain it therein until fluid pressure in said second pressure chamber has been sufficiently dissipated, as determined by said second choke and check means, for rendering said biasing spring effective for restoring said piston to its said upper position, whereby cycling action of said piston between its said upper and lower positions may be effected by alternate operation of said foot pedal between its said released and depressed positions in response to each warning signal emitted by the warning device each time said exhaust valve is operated to its said unseated position.

8. In a fluid pressure brake system for a railway type vehicle, the combination with a brake pipe normally charged with fluid at a predetermined pressure, a brake cylinder device operable responsively to fluid pressure for effecting a brake application on the vehicle according to the degree of fluid pressure supplied thereto, and a control valve device operable responsively to a reduction of fluid pressure in said brake pipe for effecting supply of fluid to the brake cylinder to a degree according to the degree of reduction in said brake pipe pressure, of a fluid pressure safety control system comprising application valve means operative to effect a reduction of fluid pressure in the brake pipe, control conduit means normally charged with fluid at a preselected pressure and effective upon a reduction in excess of a certain amount from said preselected pressure for effecting operation of the application valve means to cause a reduction of fluid pressure in the brake pipe to effect a penalty brake application, fluid pressure differential responsive valve means including fluid pressure responsive means subjectable to opposing fluid pressures and operable from one position, in which a venting communication for effecting reduction of fluid pressure in said control conduit means is opened, to another position in which said venting communication is closed for terminating reduction of fluid pressure in said control conduit means, and reversely, depending upon the direction of the resultant differential force between said opposing fluid pressures, and means including manually operable control means operative in one position for effecting simultaneous supply of pressurized fluid to opposite sides of said fluid pressure responsive means at different relative rates and operable to a different position for effecting simultaneous release of fluid pressure from said opposite sides of said fluid pressure responsive means at different relative rates for controlling the direction of said resultant differential force whereby to effect alternate operation of said fluid pressure differential responsive valve means from its said one position to its said other position and reversely so as to prevent reduction of fluid pressure in said control conduit means in excess of said certain amount.

9. A fluid pressure safety control system as defined in claim 8, further characterized by cut-off means interposed in said control conduit means and normally occupying an open position in which communication through said control conduit means is open, said cut-off means being operable responsively to a preselected pressure in the brake cylinder to a closed position for closing said communication through said control conduit means.

References Cited in the file of this patent

UNITED STATES PATENTS 2,998,285    Otto _____ Aug. 29, 1961

FOREIGN PATENTS 335,634    Italy _____ Feb. 7, 1936